(12) United States Patent
Lehman et al.

(10) Patent No.: US 7,396,392 B2
(45) Date of Patent: Jul. 8, 2008

(54) INSTALLATION FOR TREATING AT LEAST ONE FLUID AND USE THEREOF FOR THE SEPARATION OF AT LEAST ONE CONSTITUENT OF A GAS MIXTURE

(75) Inventors: Jean-Yves Lehman, Maisons Alfort (FR); Benoît Davidian, Saint-Maur-des-Fosses (FR); Philippe Fert, Faucon (FR)

(73) Assignee: L'Air Liquide, Societe Anonyme A Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 513 days.

(21) Appl. No.: 10/505,729

(22) PCT Filed: Feb. 17, 2003

(86) PCT No.: PCT/FR03/00508

§ 371 (c)(1),
(2), (4) Date: Apr. 7, 2005

(87) PCT Pub. No.: WO03/072238

PCT Pub. Date: Sep. 4, 2003

(65) Prior Publication Data
US 2005/0172809 A1    Aug. 11, 2005

(30) Foreign Application Priority Data
Feb. 26, 2002    (FR) .................................. 02/02392

(51) Int. Cl.
*B01D 53/02* (2006.01)

(52) U.S. Cl. .......................................... 96/153; 55/516
(58) Field of Classification Search .................. 96/108, 96/153; 55/512, 516, 518
See application file for complete search history.

(56) References Cited

U.S. PATENT DOCUMENTS

| | | | |
|---|---|---|---|
| 3,410,055 A * | 11/1968 | Zenz | ............................. 95/276 |
| 3,960,520 A | 6/1976 | Allen | |
| 3,987,148 A | 10/1976 | Squires | |
| 4,126,435 A * | 11/1978 | Reese | ........................... 55/474 |
| 4,670,226 A | 6/1987 | Furuyama et al. | |
| 5,882,385 A | 3/1999 | Bosquain et al. | |

FOREIGN PATENT DOCUMENTS

| | | |
|---|---|---|
| EP | 0 778 082 A1 | 6/1997 |
| FR | 2 741 823 | 6/1997 |

OTHER PUBLICATIONS

International Search Report for PCT/FR03/00508.

\* cited by examiner

*Primary Examiner*—Robert A Hopkins
(74) *Attorney, Agent, or Firm*—Elwood Haynes

(57) ABSTRACT

An apparatus and method of use for treating at least one fluid, in a container that holds at least one mass of a particulate material between two perforated walls. Near the upper part of the mass, at least one deflector extends from the first wall towards the second wall. Fluid flows through the walls horizontally, and the deflector is positioned at an angle to this horizontal fluid flow direction. With this particular apparatus configuration, an area close to the second wall and opposite the adjacent end of the deflector is formed, which is generally free of particulate matter; thus, resulting in a more efficient treatment process.

6 Claims, 1 Drawing Sheet

INSTALLATION FOR TREATING AT LEAST ONE FLUID AND USE THEREOF FOR THE SEPARATION OF AT LEAST ONE CONSTITUENT OF A GAS MIXTURE

BACKGROUND

The present invention relates to installations for treating at least one fluid, of the type comprising, in a container, at least one mass of particulate material which is retained between two perforated walls and through which the fluid flows in an approximately horizontal direction, and, near the upper part of the mass, at least one deflecting surface extending from a first of said walls toward the second wall, making an angle with the horizontal flow direction of the fluid.

An installation of this type is disclosed in document FR-A-2 741 823. In the installations disclosed in that document, the volume around the open region for charging with particulate material at the end of the deflecting surface is entirely occupied by the particulate material.

SUMMARY

The inventors found that such an installation could be made more effective by providing, according to one feature of the invention, an empty region devoid of particulate material near the second wall, facing the adjacent end of the deflecting surface.

This is because the inventors have found that an empty region of this type promotes passage of the gases at the end of the deflecting surface and thus makes it possible to reduce the time during which these gases are in contact with the particulate material in the upper part of the mass.

The subject of the invention is also the use of such an installation for separating out at least one constituent of a gas mixture, for example for drying or purifying of a gas, and/or for separating out at least one constituent of a gas mixture, especially for purifying a stream of air to be distilled, or for producing oxygen and/or nitrogen from a stream of air.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
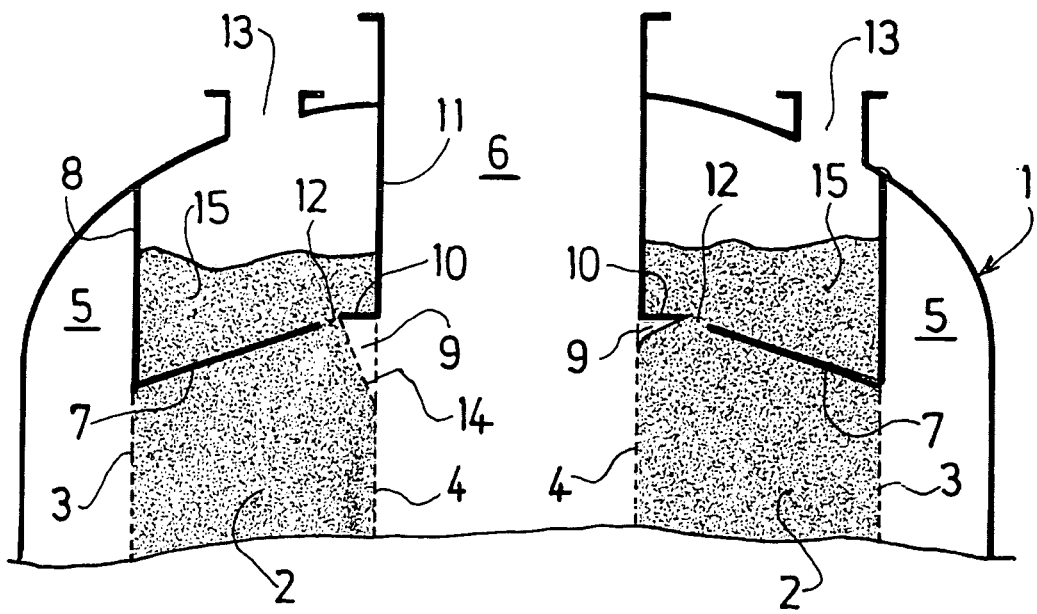
FIG. 1 illustrates a sectional view of the upper portion of a fluid separating apparatus with the annular mass of particulate matter shown in two different embodiments, according to the invention.

In the description that follows and in the drawings, identical or similar elements bear the same reference numerals, possibly with exponents.

FIG. 1 shows an embodiment of an absorption device or reactor comprising a vertical container 1 that contains at least one mass 2, which is annular in the embodiment shown, of particulate material, typically of an adsorbent, retained between two concentric perforated walls 3 and 4 defining, in the container 1, an external annular chamber 5 and an internal chamber 6 between which the fluid flows by passing radially through the mass 2.

In the upper region of the adsorbent mass 2, a deflecting surface 7 extends from the region where the outer perforated wall 3 joins the solid linking wall or shell 8 that extends the perforated wall upward to a point close to the dome of the container 1.

According to the invention, a region 9 devoid of particulate material is provided facing the free end of the deflecting surface 7. More specifically, this region 9 is bounded at the top by an annular plate 10 extending approximately horizontally toward the outside from the region where the inner perforated wall joins the solid linking shell 11, the plate 10 extending as far as a point facing the free end of the deflecting surface 7 in order to provide, with this surface, the annular passage 12 for charging the space between the perforated walls 3 and 4 with particulate material, by pouring this particulate material into the container 1 via the top charging openings 13.

As shown in the right-hand part of FIG. 1, the empty space 9 may be obtained by merely the presence of the plate 10, which is advantageously horizontal, through the natural heaping effect produced when filling the volume between the perforated walls 3 and 4.

In order for the empty volume 9 to be controlled more precisely and not to be limited by the natural angle of repose of the particulate material, it will be advantageous for this empty region to be bounded by at least one perforated wall 14 extending between the free end of the plate 10 and the perforated wall 4, as shown in the left-hand part of FIG. 1, in which two concentric annular perforated walls $14_1$ and $14_2$ of different lengths extend axially downward from the free-end of the plate 10 and from a central region of the latter, the space 9 then being bounded downward by the natural angle of repose of the particulate material starting from the free ends of the perforated walls $14_1$ and $14_2$.

As may be seen in the drawings, the empty region 9 alone is devoid of particulate material near the free end of the deflecting surface 7, which surface remains embedded in the particulate material beneath the reserve 15 of particulate material that isolates the active portion 2 and allow the filling of said portion to be topped up while the material settles during use.

Figure 2:
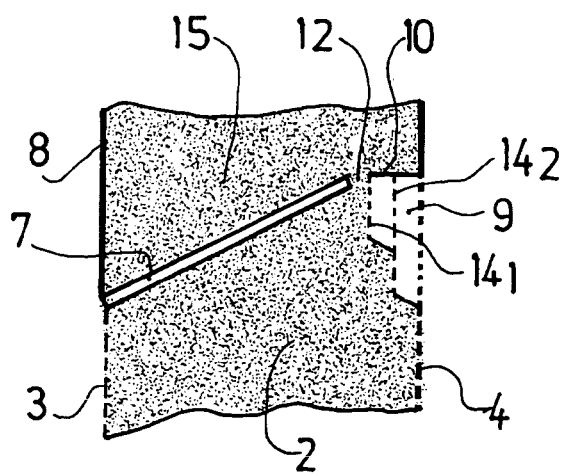
FIG. 2 illustrates a vertical sectional view of another embodiment of the invention.

Modifications and variants may be introduced within the context of the claims below. Thus, in a variant of the embodiment of FIG. 2, annular walls $14_i$ may be placed "in staircase fashion", spaced apart radially, starting from the inner wall $14_i$ via horizontal annular supports that join the bottom of the upstream wall to the top of the following downstream wall.

In the case of an installation comprising two adjacent beds of particulate materials, for example beds of alumina and of zeolite, which are separated by an intermediate perforated wall, it is possible to combine a pair of arrangements according to the variants described above in the two beds.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An apparatus for treating at least one fluid comprising a container, wherein said container comprises:

a) a first and a second perforated wall, wherein said fluid flows substantially horizontally through said walls;

b) at least one mass of particulate matter, wherein said mass is retained between said first and said second walls; and c) at least one deflecting surface, wherein said deflecting surface:
  1) extends from said first wall toward said second wall; and
  2) is located at an angle with said horizontal flow of said fluid such that a region without said particulate mailer is created near to said second wall and the adjacent end of said deflecting surface, wherein said region is bounded at the top by a second surface, wherein said second surface extends from said second wall toward said adjacent end of said deflecting surface.

2. The apparatus of claim 1, wherein said second surface is substantially horizontal.

3. The apparatus of claim 1, wherein said region is bounded laterally by at least one said wall.

4. A method of separating at least one member of a fluid mixture comprising treating said fluid mixture with an apparatus, wherein said apparatus comprises:

a) a first and a second perforated wall, wherein said fluid flows substantially horizontally through said walls;

b) at least one mass of particulate matter, wherein said mass is retained between said first and said second walls; and c) at least one deflecting surface, wherein said deflecting surface:
  1) extends from said first wall toward said second wall; and
  2) is located at an angle with said horizontal flow of said fluid such that a region without said particulate matter is created near to said second wall and the adjacent end of said deflecting surface, wherein said region is bounded at the top by a second surface, wherein said second surface extends from said second wall toward said adjacent end of said deflecting surface.

5. The apparatus of claim 4, wherein said second surface is substantially horizontal.

6. The apparatus of claim 4, wherein said region is bounded laterally by at least one said wall.

* * * * *